United States Patent [19]
O'Loughlin et al.

[11] Patent Number: 5,751,885
[45] Date of Patent: May 12, 1998

[54] CENTRALIZED VIDEO SYSTEM

[76] Inventors: Maureen O'Loughlin; Brian O'Loughlin, both of 200 Charlemont, Griffith Avenue, Dublin 9, Ireland

[21] Appl. No.: 574,921

[22] Filed: Dec. 19, 1995

[51] Int. Cl.$^6$ .............................. H04N 5/91; H04N 7/00; H04N 5/225; H04N 5/76
[52] U.S. Cl. .............................. 386/46; 386/117; 364/300
[58] Field of Search ................... 386/46, 117; 348/143, 348/158, 207, 7, 8, 159; 364/300

[56] References Cited

U.S. PATENT DOCUMENTS

| | | | |
|---|---|---|---|
| 4,821,118 | 4/1989 | Lafreniere | 358/108 |
| 5,138,456 | 8/1992 | Frixon | 358/186 |
| 5,144,454 | 9/1992 | Cury | 358/335 |
| 5,264,935 | 11/1993 | Nakajima | 358/181 |
| 5,325,202 | 6/1994 | Washino | 348/222 |
| 5,576,838 | 11/1996 | Renie | 386/117 |
| 5,609,534 | 3/1997 | Gebhart et al. | 473/409 |
| 5,613,032 | 3/1997 | Cruz et al. | 386/69 |

*Primary Examiner*—Tommy P. Chin
*Assistant Examiner*—David R. Vincent
*Attorney, Agent, or Firm*—Richard L. Miller, P.E.

[57] ABSTRACT

A centralized video system that is designed for large theme parks and popular tourist areas that allows the user to be in the video by freeing the user from carrying a video camcorder and can produce a customized video on the spot by adding background music, introductions, and conclusion. The centralized video system includes at least one remote video recorder, imparting apparatus, combining apparatus, producing apparatus, identifying apparatus, and dispensing apparatus. Each remote video recorder records at least one video clip for each customer. The imparting apparatus imparts a different customer identification code for each customer on all the video clips recorded for that customer. The combining apparatus combines all the video clips by the different customer identification code. The producing apparatus produces a video of the combined video clips for each different customer identification number. The identifying apparatus identifies the produced video by the different customer identification code. The dispensing apparatus dispenses the identified produced video. And, at least two remote interactive video recorders can be used wherein one of is adaptable to a ride and another is adaptable to the customer so that a separate concurrent image can be produced on the video to highlight the facial expressions of the customer during exciting parts of the ride.

30 Claims, 2 Drawing Sheets

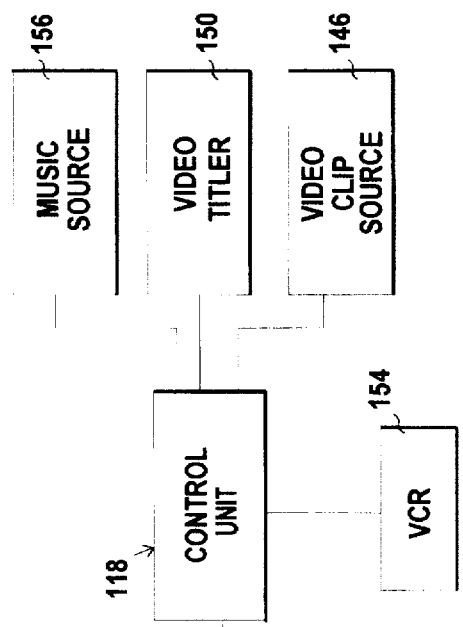
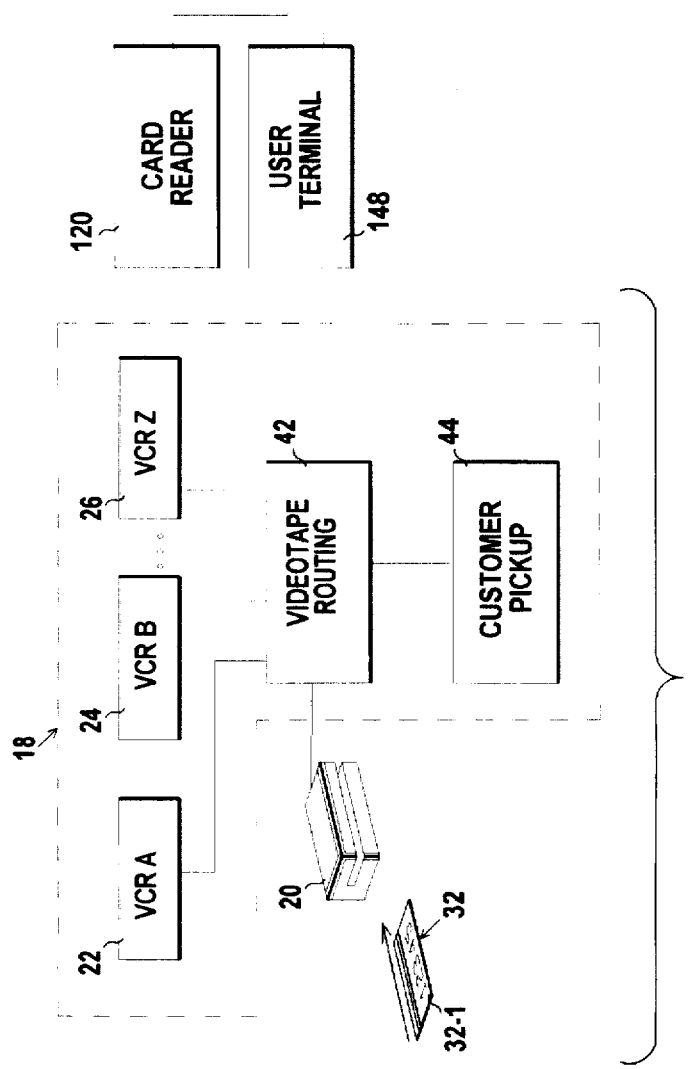

5,751,885

CENTRALIZED VIDEO SYSTEM

BACKGROUND OF THE INVENTION

The present invention relates to a centralized video system. More particularly, the present invention relates to a centralized video system that integrates video clips from separate video stations into a central processing and collection facility wherein each of the video clips are identified by a respective user card number and are culminated into a user video that is identified by the respective user card number and dispensed by the action of the respective user card.

Videos have always been a source of pleasure and a way of retaining cherished moments. There are times, however, when the operator of the video camera desires to be in the video which is difficult to accomplish.

Amusement parks have also been a source of pleasure. If a person desires to be video taped while on a ride, another person must operate the camera while focusing the camera on the moving ride. This is not an easy task. If that same person desires to use another ride, the person operating the camera must relocate and repeat the process.

Further, there are times when the user desires to integrate special features into the video. This could not be achieved on the spot and would require the production of a customized video.

The production of a customized video normally requires many machines and many separate steps. For example, with respect to music videos, two performances are normally required.

In the first performance, a performer sings lyrics which are recorded on an audio track. The performed lyrics are mixed together with music and other background audio information to create an audio signal.

In the second performance, the performer lip-syncs to the audio signal while being video taped. The video taped performance, without any audio information, is superimposed on a suitable background image.

A final product is formed by yet another device, for example, an audio/video mixer, which combines the composite video image with the previously obtained composite audio recording.

Numerous innovations for video production systems have been provided in the prior art that will be described. However, even though these innovations may be suitable for the specific individual purposes to which they address, they differ from the present invention in that they do not teach a centralized video system that integrates video clips from separate video stations into a central processing and collection facility wherein each of the video clips are identified by a respective user card number and are culminated into a user video that is identified by the respective user card number and dispensed by the action of the respective user card.

For example, U.S. Pat. No. 5,138,456 to Frixon teaches a video camera that includes a lens, an image analyzer, management circuits, an incorporated programmable oscillator, a modulator, an antenna, a scanning tuner, tuning detector circuit, and an electronic calculating unit.

Another example, U.S. Pat. No. 5,144,454 to Cury teaches an apparatus for producing customized videos that includes audio/video reproduction equipment for providing first and second audio signals, audio/video reproduction equipment for providing first and second video signals, and a mixer to combine the first and second audio signals and the first and second video signals to form the customized video.

Still another example, U.S. Pat. No. 5,264,935 to Nakajima teaches a system for wireless transmission and reception of a video signal that includes transmitting apparatus provided with terminals corresponding and attachable to terminals of a video camera body. Receiving apparatus is provided with an input switch which automatically switches between a broadcast TV signal and a signal transmitted from a video camera.

Finally, yet another example, U.S. Pat. No. 5,325,202 to Washino teaches a video field-production control system that includes a central control unit, a mounting frame for holding the central control unit, an interface module dedicated to each camera to be used in the system, a power supply, a master synchronization generator, a production switcher, customized connectors, and customized cables.

It is apparent that numerous innovations for video production systems have been provided in the prior art that are adapted to be used. Furthermore, even though these innovations may be suitable for the specific individual purposes to which they address, they would not be suitable for the purposes of the present invention as heretofore described.

SUMMARY OF THE INVENTION

Accordingly, an object of the present invention is to provide a centralized video system that avoids the disadvantages of the prior art.

Another object of the present invention is to provide a centralized video system that is simple and inexpensive to manufacture.

Still another object of the present invention is to provide a centralized video system that is simple to use.

Yet another object of the present invention is to provide a centralized video system that is designed for large theme parks and popular tourist areas.

Still yet another object of the present invention is to provide a centralized video system that is designed to free the user from carrying a video cam-corder.

Yet still another object of the present invention is to provide a centralized video system that is designed to allow the user to be in the video.

Still yet another object of the present invention is to provide a centralized video system that produces a customized video on the spot.

Yet still another object of the present invention is to provide a centralized video system that adds background music, introductions, and conclusions.

Briefly stated, still yet another object of the present invention is to provide a centralized video system that includes at least one remote video recorder, imparting apparatus, combining apparatus, producing apparatus, identifying apparatus, and dispensing apparatus.

Yet still another object of the present invention is to provide a centralized video system wherein each remote video recorder records at least one video clip for each customer.

Still yet another object of the present invention is to provide a centralized video system wherein the imparting apparatus imparts a different customer identification code for each customer on each video clip recorded.

Yet still another object of the present invention is to provide a centralized video system wherein the combining apparatus combines each video clip by the different customer identification code.

Still yet another object of the present invention is to provide a centralized video system wherein the producing apparatus produces a video of the combined video clips for each different customer identification number.

Yet still another object of the present invention is to provide a centralized video system wherein the identifying apparatus identifies the produced video by the different customer identification code.

Still yet another object of the present invention is to provide a centralized video system wherein the dispensing apparatus dispenses the identified produced video.

Yet still another object of the present invention is to provide a centralized video system wherein the imparting apparatus includes a remote card reader in communication with the remote video recorders.

Still yet another object of the present invention is to provide a centralized video system wherein the imparting apparatus further includes a card that contains the customer identification code that is readable by the remote card reader.

Yet still another object of the present invention is to provide a centralized video system wherein the customer identification code is in a form selected from a group consisting of magnetic strip and bar code.

Still yet another object of the present invention is to provide a centralized video system wherein the combining apparatus is included in a central control unit centrally disposed from the remote video recorders.

Yet still another object of the present invention is to provide a centralized video system wherein the producing apparatus is included in the central control unit.

Still yet another object of the present invention is to provide a centralized video system wherein the identifying apparatus includes a central card reader in communication with the central control unit.

Yet still another object of the present invention is to provide a centralized video system wherein the dispensing apparatus is included in the central control unit.

Still yet another object of the present invention is to provide a centralized video system wherein the central control unit has a customer terminal for customizing the combined video clips.

Yet still another object of the present invention is to provide a centralized video system wherein the customizing is selected from a group consisting of music from a music source, title from a video titler, and credits including the name of the customer.

Still yet another object of the present invention is to provide a centralized video system wherein the remote video recorders include remote interactive video recorders.

Yet still another object of the present invention is to provide a centralized video system wherein the video clip is the customer on a ride.

Still yet another object of the present invention is to provide a centralized video system wherein one of the remote interactive video recorders is adaptable to the ride and another is adaptable to the customer so that a first image from one remote interactive video recorder can be combined with a separate concurrent second image from the other remote interactive video recorder to form two individual concurrent images wherein the first image can be used to highlight the facial expressions of the customer during exciting parts of the ride.

Yet still another object of the present invention is to provide a centralized video system wherein the central control unit communicates with the remote video recorders by apparatus selected from a group consisting of radio waves and cable.

Still yet another object of the present invention is to provide a method of using a centralized video system that includes the steps of providing a different customer identification number for each customer, producing at least one video clip for each customer, imparting the different customer identification number on each video clip produced for each customer, sorting the video clips by the different customer identification number, combining the sorted video clips by the different customer identification number, producing a video of the combined sorted video clips for each different customer identification number, identifying the produced video by the different customer identification number, and dispensing the identified produced video to the customer whose different customer identification number has been identified.

Finally, yet still another object of the present invention is to provide a method of using a centralized video system that further includes the step adding information selected from a group consisting of music from a music source, title from a video titler, and credits including the name of the customer.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows:

FIG. 2 is a block diagram illustrating the control station of the instant invention; and FIG. 3 is a block diagram illustrating an alternate embodiment of the control station, having user option selection and video editing capabilities.

LIST OF REFERENCE NUMERALS UTILIZED IN THE DRAWING

Figure 1:
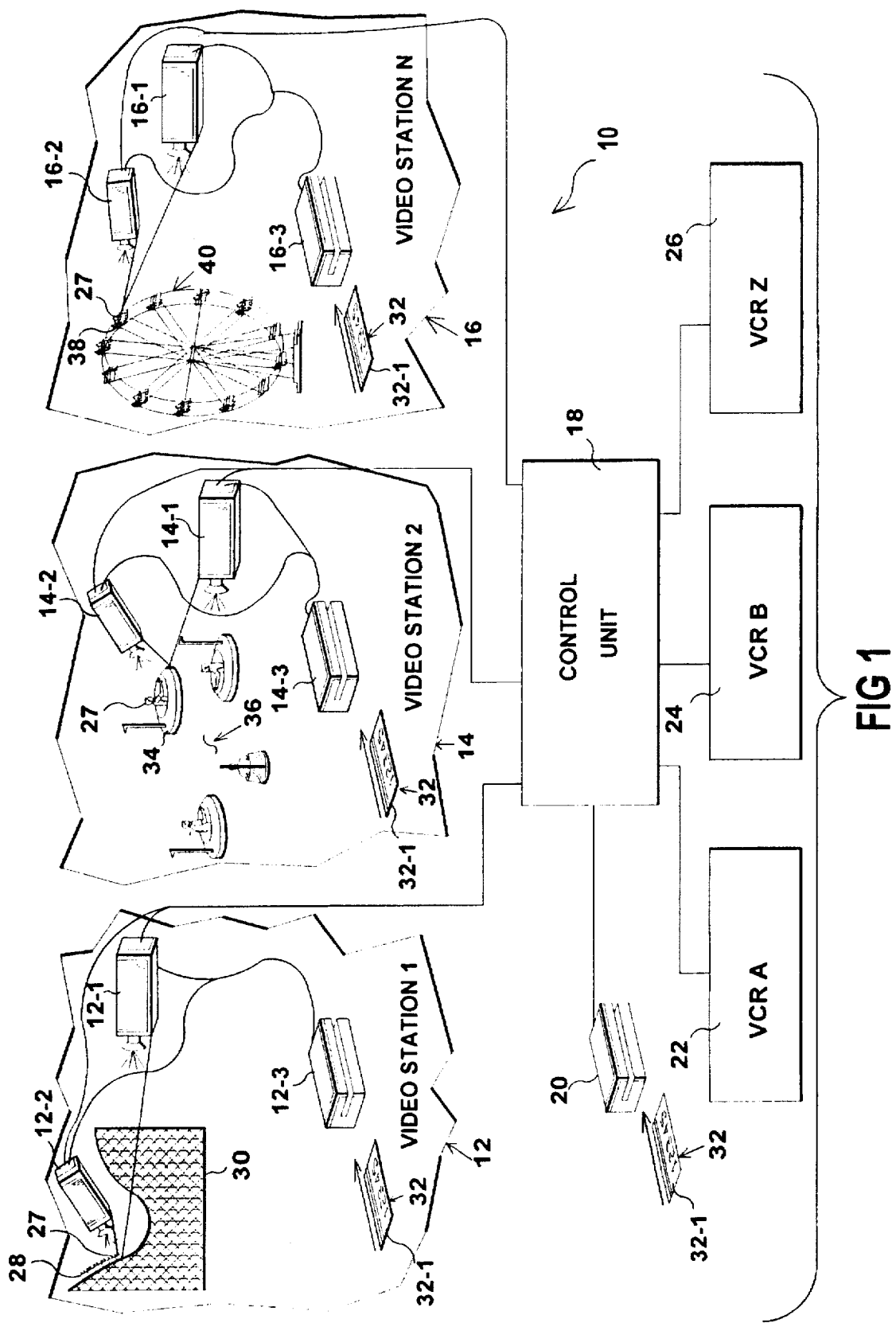
FIG. 1 is a diagrammatic view illustrating the preferred embodiment of the instant invention per se.

Preferred Embodiment 10 centralized video system of the present invention
12 first video station
12-1 first video station ride recorder
12-2 optional first video station customer recorder
12-3 first video station card reader
14 second video station
14-1 second video station ride recorder
14-2 optional second video station customer recorder
14-3 second video station card reader
16 "N"th video station
16-1 "N"th video station ride recorder
16-2 optional "N"th video station customer recorder
16-3 "N"th video station card reader
18 central control unit
20 central control unit card reader
22 "A" video
24 "B" video
26 "Z" video
27 specific customer
28 roller coaster car
30 roller coaster ride 32 customer identification card
32-1 specific customer identification card code
34 bumper car
36 bumper car ride
38 ferris wheel car
40 ferris wheel ride
42 routing module
44 specific customer pickup Alternate Embodiment 118 central control unit
120 central control unit card reader
146 all video clips
148 user terminal
150 video titler
154 truly customized video
156 music source

DETAILED DESCRIPTION OF THE PREFERRED EMBODIMENT

Referring now to the figures in which like numerals indicate like parts, and particularly to FIG. 1, the centralized video system of the present invention is shown generally at 10 and includes a first video station 12, a second video station 14, a "N"th video station 16, a central control unit 18 remote from the first video station 12, the second video station 14, and the "N"th video station 16, a central control unit card reader 20, an "A" video 22, a "B" video 24, and a "Z" video 26.

It is to be understood, however, that the first video station 12, the second video station 14, and the "N"th video station 16 are for illustrative purposes only and that the presence of the "N"th video station 16 illustrates that any number of individual video stations can be used in the centralized video system 10.

Further, it is to be understood, however, that the "A" video 22, the "B" video 24, and the "Z" video 26 are for illustrative purposes only and that the presence of the "Z" video 26 illustrates that any number of individual video tapes can be produced by users of the centralized video system 10.

The configuration of the first video station 12 can best be seen in FIG. 1, and as such, will be discussed with reference thereto.

The first video station 12 uses the theme of a specific customer 27 in a roller coaster car 28 of a roller coaster ride 30.

It is to be understood, however, that the use of the theme of the roller coaster ride 30 is for illustrative purposes only and that any theme can be used for the first video station 12.

A first video station ride recorder 12-1 is positioned on the front of the roller coaster car 28. An optional first video station customer recorder 12-2 can be affixed to the specific customer 27 and is interactive with the first video station ride recorder 12-1.

The use of the first video station ride recorder 12-1 allows the combination of the specific customer 27 and the roller coaster car 28 to be recorded as a first image while the use of the optional first video station customer recorder 12-2 allows only the specific customer 27 to be recorded as a second image.

The first image from the first video station ride recorder 12-1 and the second image from the optional first video station customer recorder 12-2 can be combined to form two individual concurrent images on the same frame. The second image can be used to highlight the facial expressions of the specific customer 27 during the exciting parts of the roller coaster ride 30.

A first video station card reader 12-3 communicates with both the first video station ride recorder 12-1 and the optional first video station customer recorder 12-2 while both the first video station ride recorder 12-1 and the optional first video station customer recorder 12-2 communicate with the central control unit 18.

The first video station ride recorder 12-1 sends the first image and the optional first video station customer recorder 12-2 sends the second image to the central control unit 18 preferably by radio waves but my also be accomplished by the use of cables.

The specific customer 27 has a customer identification card 32 containing a specific customer identification card code 32-1 which identities that specific customer 27 and is readable by the first video station card reader 12-3. The specific identification code 32-1 may be in the form of a magnetic strip or a bar code, but is not limited to that. When the specific customer 27 decides to use the first video station 12, the customer identification card 32 is swiped through the first video station card reader 12-3 and the specific customer identification card code 32-1 is imparted unto the respective video clip produced by the first video station 12 for that specific customer 27.

The configuration of the second video station 14 can best be seen in FIG. 1, and as such, will be discussed with reference thereto.

The second video station 14 uses the theme of the specific customer 27 in a bumper car 34 of bumper car ride 36.

It is to be understood, however, that the use of the theme of the bumper car ride 36 is for illustrative purposes only and that any theme can be used for the second video station 14.

A second video station ride recorder 14-1 is positioned on the front of the bumper car 34. An optional second video station customer recorder 14-2 can be affixed to the specific customer 27 and is interactive with the second video station ride recorder 14-1. The use of the second video station ride recorder 14-1 allows the combination of the specific customer 27 and the bumper car 34 to be recorded as a first image while the use of the optional second video station customer recorder 14-2 allows only the specific customer 27 to be recorded as a second image.

The first image from the second video station ride recorder 14-1 and the second image from the optional second video station customer recorder 14-2 can be combined to form two individual concurrent images on the same frame. The second image can be used to highlight the facial expressions of the specific customer 27 during the exciting parts of the bumper car ride 36.

A second video station card reader 14-3 communicates with both the second video station ride recorder 14-1 and the optional second video station customer recorder 14-2 while both the second video station ride recorder 14-1 and the optional second video station customer recorder 14-2 communicate with the central control unit 18.

The second video station ride recorder 14-1 sends the first image and the optional second video station customer recorder 14-2 sends the second image to the central control unit 18 preferably by radio waves but my also be accomplished by the use of cables.

The specific customer identification card code 32-1 is readable also by the second video station card reader 14-3. When the specific customer 27 decides to use the second video station 14, the customer identification card 32 is swiped through the second video station card reader 14-3 and the specific customer identification card code 32-1 is imparted unto the respective video clip produced by the second video station 14 for that specific customer 27.

The configuration of the "N"th video station 16 can best be seen in FIG. 1, and as such, will be discussed with reference thereto.

The "N"th video station 16 uses the theme of the specific customer 27 in a ferris wheel car 38 of ferris wheel ride 40.

It is to be understood, however, that the use of the theme of the ferris wheel ride 40 is for illustrative purposes only and that any theme can be used for the "N"th video station 16.

A "N"th video station ride recorder 16-1 is positioned on the front of the ferris wheel car 38. An optional "N"th video station customer recorder 16-2 can be affixed to the specific customer 27 and is interactive with the "N"th station ride recorder 16-1. The use of the "N"th video station ride recorder 16-1 allows the combination of the specific customer 27 and the ferris wheel car 38 to be recorded as a first image while the use of the optional "N"th video station customer recorder 16-2 allows only the specific customer 27 to be recorded as a second image.

The first image from the "N"th video station ride recorder 16-1 and the second image from the optional "N"th video station customer recorder 16-2 can be combined to form two individual concurrent images on the same frame. The second image can be used to highlight the facial expressions of the specific customer 27 during the exciting parts of the ferris wheel ride 40.

A "N"th video station card reader 16-3 communicates with both the "N"th video station ride recorder 16-1 and the optional "N"th video station customer recorder 16-2 while both the "N"th video station ride recorder 16-1 and the optional "N"th video station customer recorder 16-2 communicate with the central control unit 18.

The "N"th video station ride recorder 16-1 sends the first image and the optional "N"th video station customer recorder 16-2 sends the second image to the central control unit 18 preferably by radio waves but my also be accomplished by the use of cables.

The specific customer identification card code 32-1 is readable also by the "N"th video station card reader 16-3. When the specific customer 27 decides to use the "N"th video station 16, the customer identification card 32 is swiped through the "N"th video station card reader 16-3 and the specific customer identification card code 32-1 is imparted unto the respective video clip produced by the "N"th video station 16 for that specific customer 27.

After a specific customer 27 has completed the use of the first video station 12, and/or the second video station 14, and/or the "N"th video station 16, the respective video clips from each of the first video station 12, and/or the second video station 14, and /or the "N" video station 16 for that specific customer 27 are combined and form either the "A" video 22, the "B" video 24, or the "Z" video 26. Each of the "A" video 22, the "B" video 24, and the "Z" video 26 are formed for each specific customer 27.

As can be seen in FIG. 2, in order to dispense the "A" video 22, the "B" video 24, and the "Z" video 26 to the proper specific customer 27, the customer identification card 32 is swiped through the central control unit card reader 20. A routing module 42 searches the "A" video 22, the "B" video 24, and the "Z" video 26 until the specific customer identification card code 32-1 matches that imparted unto the "A" video 22, the "B" video 24, or the "Z" video 26. Once the proper one of the "A" video 22, the "B" video 24, or the "Z" video 26 for that specific customer 27 has been identified, it is dispensed for specific customer pickup 44. The proper one of the "A" video 22, the "B" video 24, or the "Z" video 26 can be dispensed via a stack of individual video machines whose respective door will open when the routing operation is completed.

An alternate embodiment of the central control unit 118 having edit capabilities can best be seen in FIG. 3, and as such, will be discussed with reference thereto.

The central control unit 118 utilizes a central control unit card reader 120 to identify all video clips 146 for a respective customer (not shown). The specific customer (not shown) utilizes a user terminal 148 to enter music from a music source 156 and/or a title from a video titler 150 to the video clip 146 and produces a truly customized video 154. The user terminal can also provide for customer pickups. Credits including the name of the specific customer (not shown) can also be added to the end of the customized video 154.

It will be understood that each of the elements described above, or two or more together, may also find a useful application in other types of constructions differing from the types described above.

While the invention has been illustrated and described as embodied in a centralized video system, it is not limited to the details shown, since it will be understood that various omissions, modifications, substitutions and changes in the forms and details of the device illustrated and its operation can be made by those skilled in the art without departing in any way from the spirit of the present invention. It is to be particularity understood that while video tape has been mentioned through this disclosure the substitution of CD-ROM, compact disk, computer hard disk, floppy disk or any other storage or recording medium and system can be utilized in the present invention and that video tape should be considered as a limitation of the claimed invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A centralized video system, comprising:
   a) at least one remote video recorder each of which recording at least one video clip for at least one customer;
   b) imparting means for imparting a different customer identification code for each of said at least one customer on each of said at least one video clip recorded for said at least one customer;
   c) an imaging means for inputting/transmitting video clips of said at least one customer to said remote video recorder, wherein said imaging means is triggered by said imparting means;
   d) combining means for combining said at least one video clip by said customer identification code;
   e) producing means for producing a video of said combined at least one video clip for each said different customer identification number;
   f) identifying means for identifying said produced video by said different customer identification code; and
   g) dispensing means for dispensing said identified produced video.

2. The system as defined in claim 1, wherein said imparting means includes a remote card reader in communication with said at least one remote video recorder.

3. The system as defined in claim 2, wherein said imparting means further includes a card that contains said customer identification code and that is readable by said remote card reader.

4. The system as defined in claim 3, wherein said customer identification code is in a form selected from a group consisting of magnetic strip and bar code.

5. The system as defined in claim 1, wherein said combining means is included in a central control unit.

6. The system as defined in claim 5, wherein said producing means is included in said central control unit.

7. The system as defined in claim 5, wherein said identifying means includes a central card reader in communication with said central control unit.

8. The system as defined in claim 5, wherein said dispensing means is included in said central control unit.

9. The system as defined in claim 5, wherein said central control unit has a customer terminal for customizing said combined at least one respective video clip.

10. The system as defined in claim 9, wherein said customizing is selected from a group consisting of music from a music source, title from a video titler, and credits including the name of said at least one customer.

11. The system as defined in claim 1, wherein said at least one remote video recorder is at least two remote interactive video recorders.

12. The system as defined in claim 11, wherein said at least one video clip is said customer on a ride.

13. The system as defined in claim 12, wherein one of said at least two remote interactive video recorders is adaptable to said ride and another of said at least two remote interactive video recorders is adaptable to said customer so that a first image from said one of said at least two remote interactive video recorders can be combined with a separate concurrent second image from said another of said at least two remote interactive video recorders to form two individual concurrent images wherein said first image can be used to highlight the facial expressions of said customer during exciting parts of said ride.

14. The system as defined in claim 5, wherein said central control unit communicates with said at least one remote video recorder by means selected from a group consisting of radio waves and cable.

15. A centralized video system, comprising:
 a) providing means for providing a different customer identification number for each of at least one customer;
 b) first producing means for producing at least one video clip or said each of said at least one customer;
 c) imparting means for imparting said different customer identification number on said at least one video clip produced for said each of said at least one customer;
 d) an imaging means for inputting/transmitting video clips of said at least one customer to a remote video recorder, wherein said imaging means is triggered by said imparting means;
 e) sorting means for sorting said at least one video clip by said different customer identification number;
 f) combining means for combining said sorted at least one video clip by said different customer identification number;
 g) second producing means for producing a video of said combined sorted at least one video clip for each said different customer identification number;
 h) identifying means for identifying said produced video by said different customer identification number; and
 i) dispensing means for dispensing said identified produced video to said at least one customer whose said different customer identification number has been identified.

16. A method of using a centralized video system, comprising the steps of:
 a) providing a different customer identification number for each of at least one customer;
 b) producing at least one video clip for said each of said at least one customer;
 c) imparting said different customer identification number on said at least one video clip produced for said each of said at least one customer;
 d) an imaging means for inputting/transmitting video clips of said at least one customer to a remote video recorder, wherein said imaging means is triggered by said imparting means;
 e) sorting said at least one video clip by said different customer identification number;
 f) combining said sorted at least one video clip by said different customer identification number;
 g) producing a video of said combined sorted at least one video clip for each said different customer identification number;
 h) identifying said produced video by said different customer identification number; and
 i) dispensing said identified produced video to said at least one customer whose said different customer identification number has been identified.

17. The method as defined in claim 16; further comprising the step of adding information selected from a group consisting of music from a music source, title from a video titler, and credits including the name of said at least one customer.

18. The method as defined in claim 17, wherein said step of adding information occurs subsequently to said combining step.

19. The method as defined in claim 17, wherein said adding step is accomplished by a user terminal.

20. A centralized video system, comprising:
 a) a first remote video recorder being positioned on a front of a vehicle of a ride in which a specific customer is riding and recording only the vehicle of the ride and the specific customer riding in it as a first image;
 b) a second remote video recorder being affixed to the specific customer riding in the vehicle of the ride and recording only the specific customer, and not the vehicle of the ride itself, as a second image; said second remote video recorder being interactive with said first remote video recorder; said first image and said second image being combined forming two individual concurrent images on the same frame of a video;
 b) imparting means for imparting a specific customer identification code for the specific customer on the video recorded for the specific customer;
 c) an imaging means for inputting/transmitting video clips of said at least one customer to said first remote video recorder, wherein said imaging means is triggered by said imparting means;
 d) a customer terminal utilized by the specific customer to customize said video of the specific customer so as to form a customized video;
 e) producing means for producing said customized video of said specific customer identification number so as to form a produced video;

f) identifying means for identifying said produced video by said specific customer identification code so as to form an identified video; and g) dispensing means for dispensing said identified produced video to the specific customer.

21. The system as defined in claim 20, wherein said imparting means includes a remote card reader in communication with said first and second remote video recorders.

22. The system as defined in claim 21, wherein said imparting means further includes a card that contains said specific customer identification code which is read by said remote card reader.

23. The system as defined in claim 22, wherein said specific customer identification code is in a form selected from the group consisting of magnetic strip and bar code.

24. The system as defined in claim 20, wherein said combining means is included in a central control unit.

25. The system as defined in claim 24, wherein said producing means is included in said central control unit.

26. The system as defined in claim 24, wherein said identifying means includes a central card reader in communication with said central control unit.

27. The system as defined in claim 24, wherein said dispensing means is included in said central control unit.

28. The system as defined in claim 24, wherein said central control unit has said customer terminal.

29. The system as defined in claim 20, wherein said customer terminal can be utilized by the specific customer to add to said video an item selected from the group consisting of music from a music source, title from a video titler, and credits including the name of the specific customer.

30. The system as defined in claim 24, wherein said central control unit communicates with said first and second remote video recorders by means selected from the group consisting of radio waves and cable.

* * * * *